United States Patent
Son et al.

(10) Patent No.: US 11,019,006 B2
(45) Date of Patent: May 25, 2021

(54) METHOD AND APPARATUS FOR SHARING BOOKING INFORMATION AND TICKET

(71) Applicant: KAKAO CORP., Jeju-si (KR)

(72) Inventors: Kyung Hee Son, Seongnam-si (KR); Ji Soo Youk, Seoul (KR); Sung Hee Kong, Yongin-si (KR); Kwang Hyun Uhm, Seoul (KR)

(73) Assignee: KAKAO CORP., Jeju-si (KR)

( * ) Notice: Subject to any disclaimer, the term of this patent is extended or adjusted under 35 U.S.C. 154(b) by 78 days.

(21) Appl. No.: 16/205,221

(22) Filed: Nov. 30, 2018

(65) Prior Publication Data

US 2019/0166076 A1 May 30, 2019

(30) Foreign Application Priority Data

Nov. 30, 2017 (KR) .......................... 10-2017-0163049

(51) Int. Cl.
*G06F 15/16* (2006.01)
*H04L 12/58* (2006.01)
(Continued)

(52) U.S. Cl.
CPC .......... *H04L 51/046* (2013.01); *G06F 3/0482* (2013.01); *G06Q 10/025* (2013.01); *H04L 65/40* (2013.01)

(58) Field of Classification Search
CPC ............................. H04L 67/10; H04L 41/0813
See application file for complete search history.

(56) References Cited

U.S. PATENT DOCUMENTS

| | | | |
|---|---|---|---|
| 2013/0238464 A1* | 9/2013 | Bank | G06Q 30/06 705/26.41 |
| 2016/0196508 A1* | 7/2016 | Richter | G06Q 50/10 705/5 |
| 2017/0178034 A1* | 6/2017 | Skeen | H04N 21/4825 |

FOREIGN PATENT DOCUMENTS

| | | |
|---|---|---|
| CN | 100588172 C | 2/2010 |
| CN | 105262750 A | 1/2016 |

(Continued)

OTHER PUBLICATIONS

Korean Office Action for KR Application No. 10-2017-0163049 dated Dec. 27, 2019.

(Continued)

*Primary Examiner* — Yves Dalencourt
(74) *Attorney, Agent, or Firm* — Cantor Colburn LLP

(57) ABSTRACT

A apparatus for sharing booking information may provide a user interface (UI) for sharing booking information, receive an input of booking information corresponding to at least one of items specifying an entirety of booking information through the UI, receive a sharing request for sharing at least one portion of the entirety of booking information through the UI, identify at least one item corresponding to booking information input until a current point in time among the items in response to the sharing request, generate a booking information sharing message including first booking information corresponding to the identified at least one item and enabling an input of second booking information corresponding to at least one other item among the items which is distinguishable from the identified at least one item, and transmit the booking information sharing message to at least one receiver terminal through a messenger.

10 Claims, 12 Drawing Sheets

(51) Int. Cl.
  *G06Q 10/02* (2012.01)
  *G06F 3/0482* (2013.01)
  *H04L 29/06* (2006.01)

(56) References Cited

FOREIGN PATENT DOCUMENTS

| | | | |
|---|---|---|---|
| CN | 107209876 | A | 9/2017 |
| JP | 2014063529 | A | 4/2014 |
| JP | 20174488 | A | 1/2017 |
| KR | 1020050081879 | A | 8/2005 |
| KR | 1020080078431 | A | 8/2008 |
| KR | 1020120045361 | A | 5/2012 |
| KR | 1020150087792 | A | 7/2015 |
| KR | 1020150095020 | A | 8/2015 |
| KR | 1020160126790 | A | 11/2016 |
| WO | 2008103002 | A1 | 8/2008 |
| WO | 2016081626 | A1 | 5/2016 |
| WO | 2017164684 | A1 | 9/2017 |

OTHER PUBLICATIONS

Japanese Office Action for corresponding JP Patent Application No. 2018-224901 dated Oct. 15, 2019.
Chinese Office Action for CN Application No. 201811445870.4 dated Dec. 24, 2020, citing the above reference(s).

* cited by examiner

FIG. 1C
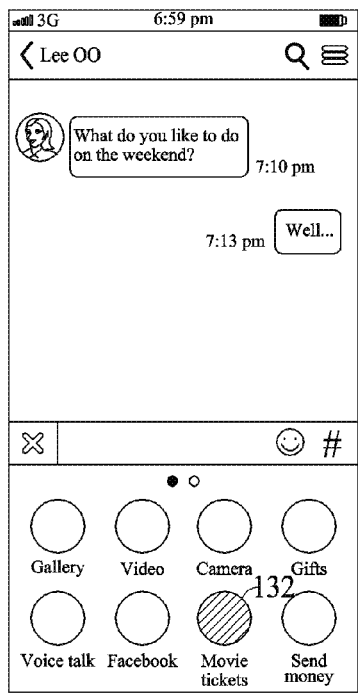
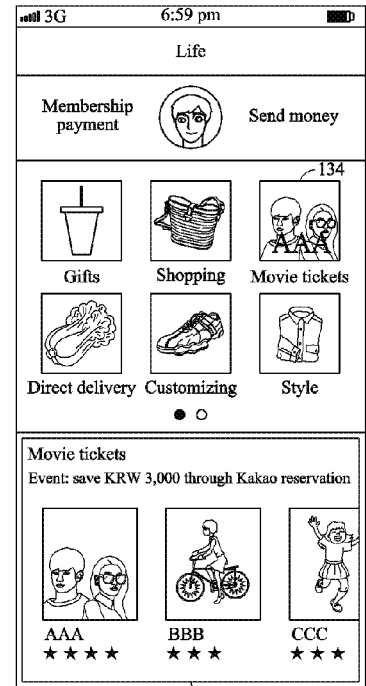
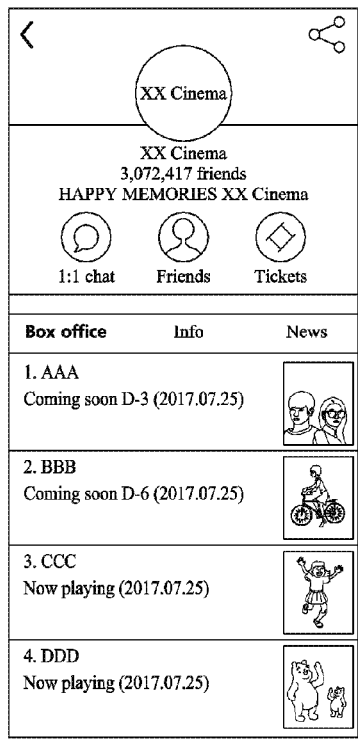

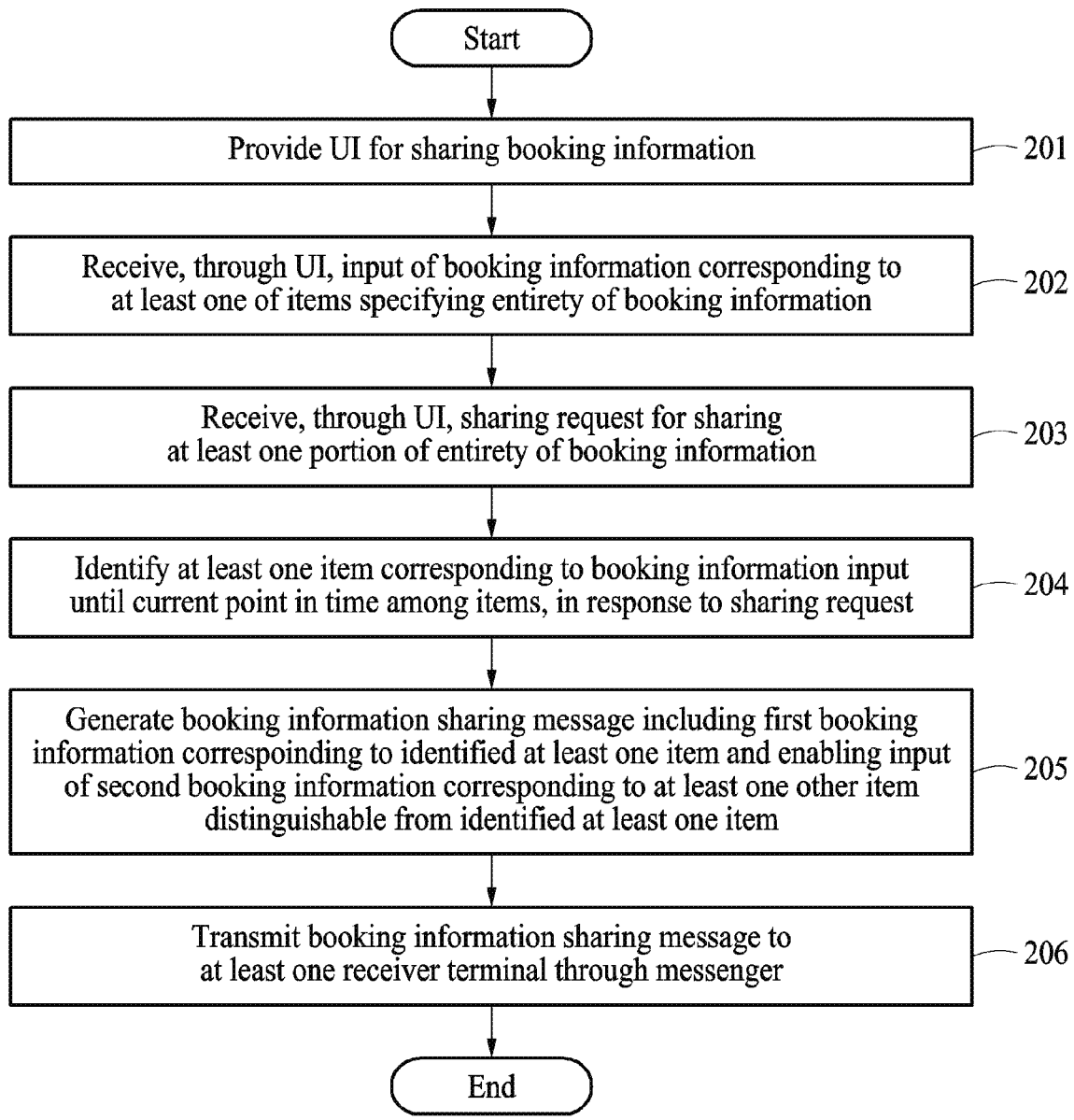

METHOD AND APPARATUS FOR SHARING BOOKING INFORMATION AND TICKET

CROSS-REFERENCE TO RELATED APPLICATIONS

This application claims the benefit under 35 USC § 119(a) of Korean Patent Application No. 10-2017-0163049 filed on Nov. 30, 2017, in the Korean Intellectual Property Office, the entire disclosure of which is incorporated herein by reference for all purposes.

BACKGROUND

1. Field

The following description relates to a method and apparatus for sharing booking information and a ticket.

2. Description of Related Art

A messenger may be an application or software configured to provide a messaging service through which users may exchange messages or data in real time. A user of a messenger may register a friend in a friend list therein, and transmit and receive messages to and from the friend registered in the friend list in real time.

For messenger-based information providing technology, various methods have been proposed, and various services have also been proposed to allow users to share information. However, some methods proposed for information sharing may be limited to simply forwarding information itself. In addition, most of methods proposed for sharing of information associated with reservation or booking may be designed merely to inform users of the information associated with the reservation or booking. Thus, there is a desire for a method of encouraging a user to participate in reservation or booking and intuitively providing the user with information associated with the reservation or booking to improve convenience of a reservation or booking related service.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of sharing booking information includes providing a user interface (UI) for sharing booking information, receiving, through the UI, an input of booking information corresponding to at least one of items specifying an entirety of booking information, receiving, through the UI, a sharing request for sharing at least one portion of the entirety of booking information, identifying at least one item corresponding to booking information input until a current point in time among the items in response to the sharing request, generating a booking information sharing message including first booking information corresponding to the identified at least one item and enabling an input of second booking information corresponding to at least one other item among the items which is distinguishable from the identified at least one item, and transmitting the booking information sharing message to at least one receiver terminal through a messenger.

In another general aspect, a method of sharing a ticket includes providing a UI for sharing a ticket, receiving, through the UI, a ticket sharing request for sharing a reserved ticket for which a reservation is completed, determining a sharing target candidate to be displayed on the UI in response to the ticket sharing request, generating an allowable ticket sharing number by subtracting a ticket sharing number from a reserved number of persons for the ticket, receiving, through the UI, a selection of at least one sharing target from among sharing target candidates by restricting a number of sharing targets to be less than or equal to the allowable ticket sharing number, and transmitting the ticket to at least one receiver terminal of the selected at least one sharing target through a messenger.

An apparatus for sharing booking information or a ticket may be controlled by a computer program stored in a non-transitory computer-readable storage medium storing instructions that, when executed by a processor, cause the processor to perform the method of sharing booking information or a ticket.

Other features and aspects will be apparent from the following detailed description, the drawings, and the claims.

BRIEF DESCRIPTION OF THE DRAWINGS

FIGS. 1B and 1C illustrate examples of a user interface (UI) used for a method of sharing booking information according to an example embodiment.

FIG. 2 is a flowchart illustrating an example of a method of sharing booking information according to an example embodiment.

Figure 1A:
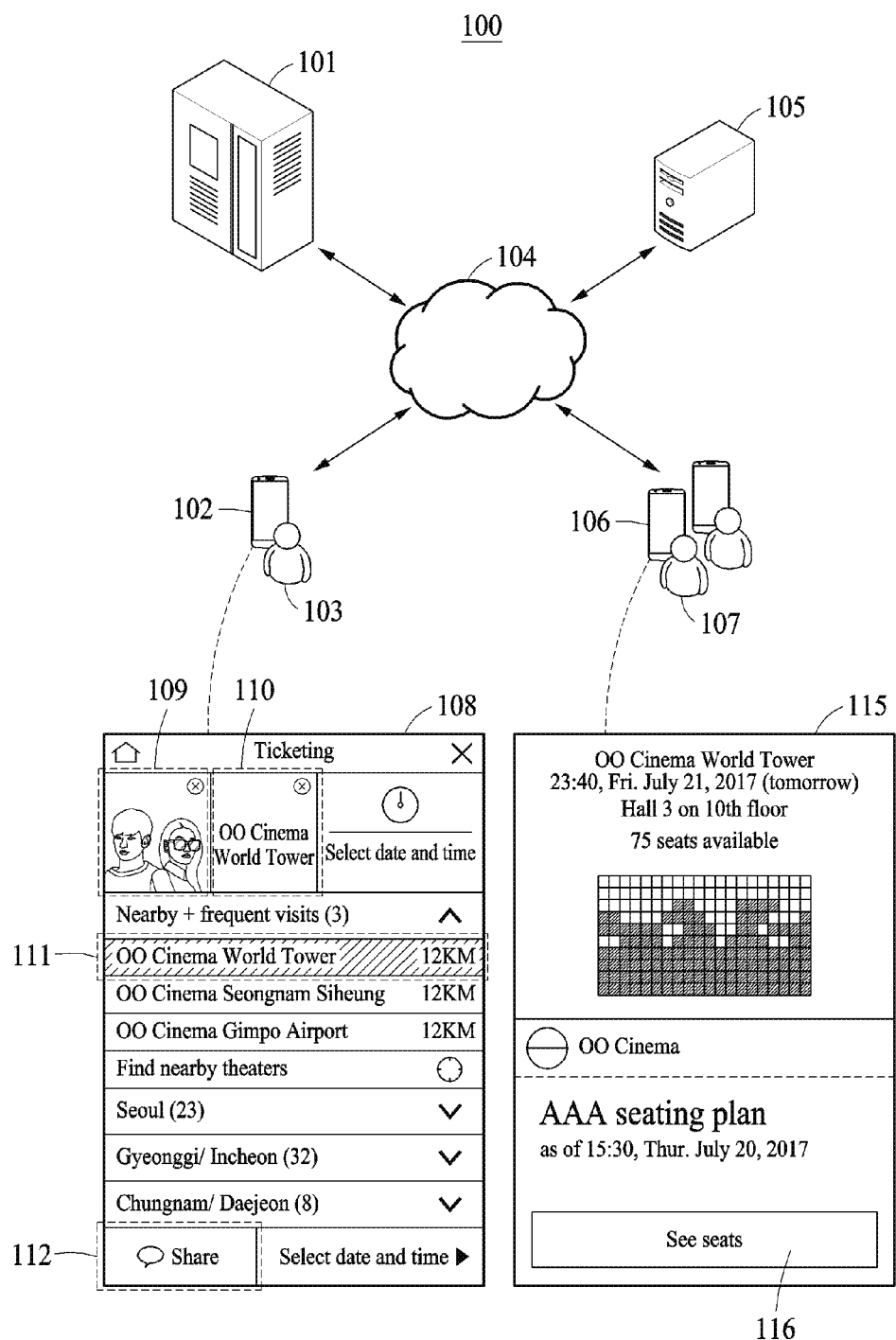
FIG. 1A illustrates an example of a system for sharing booking information or a ticket according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof. In addition, as used herein, the term "and/or" includes any one and any combination of any two or more of the associated listed items.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 1B:
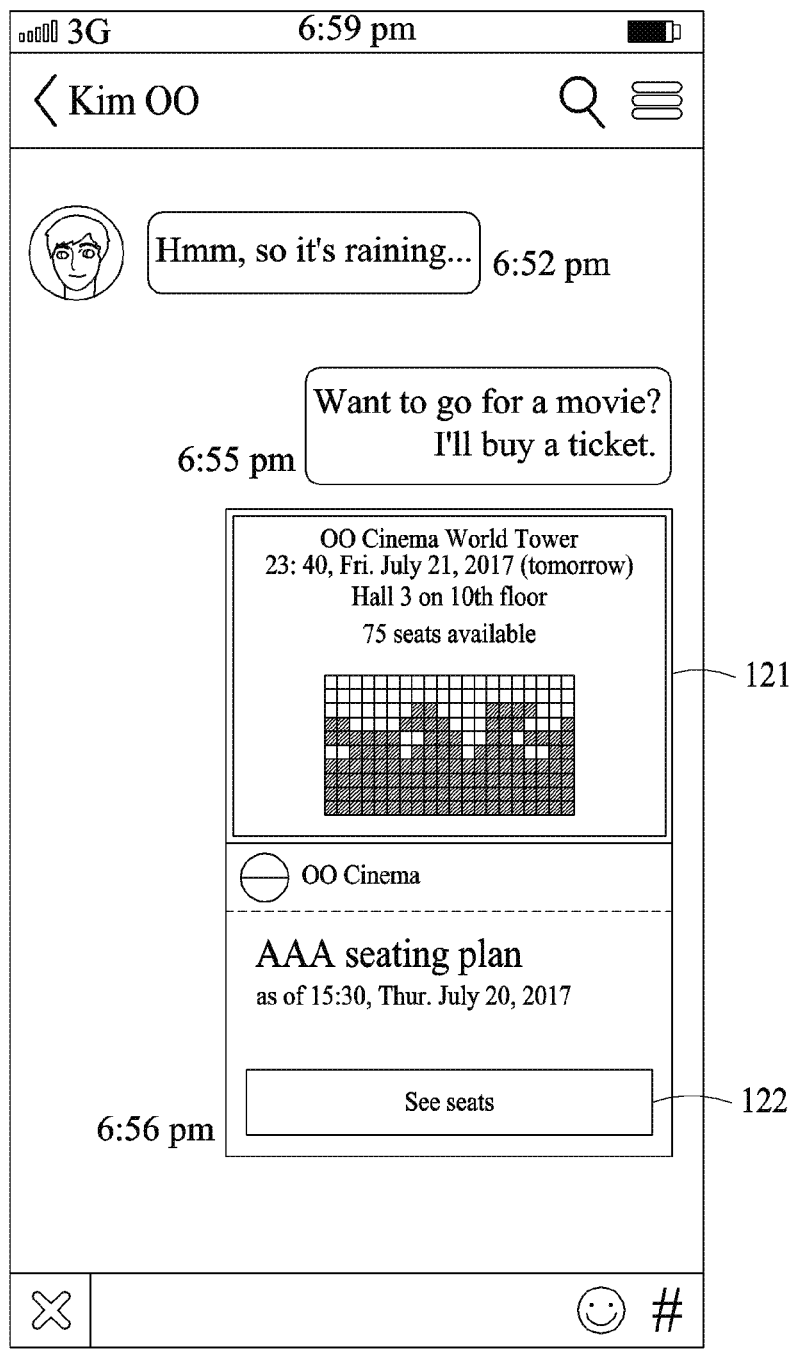
Figure 3A:
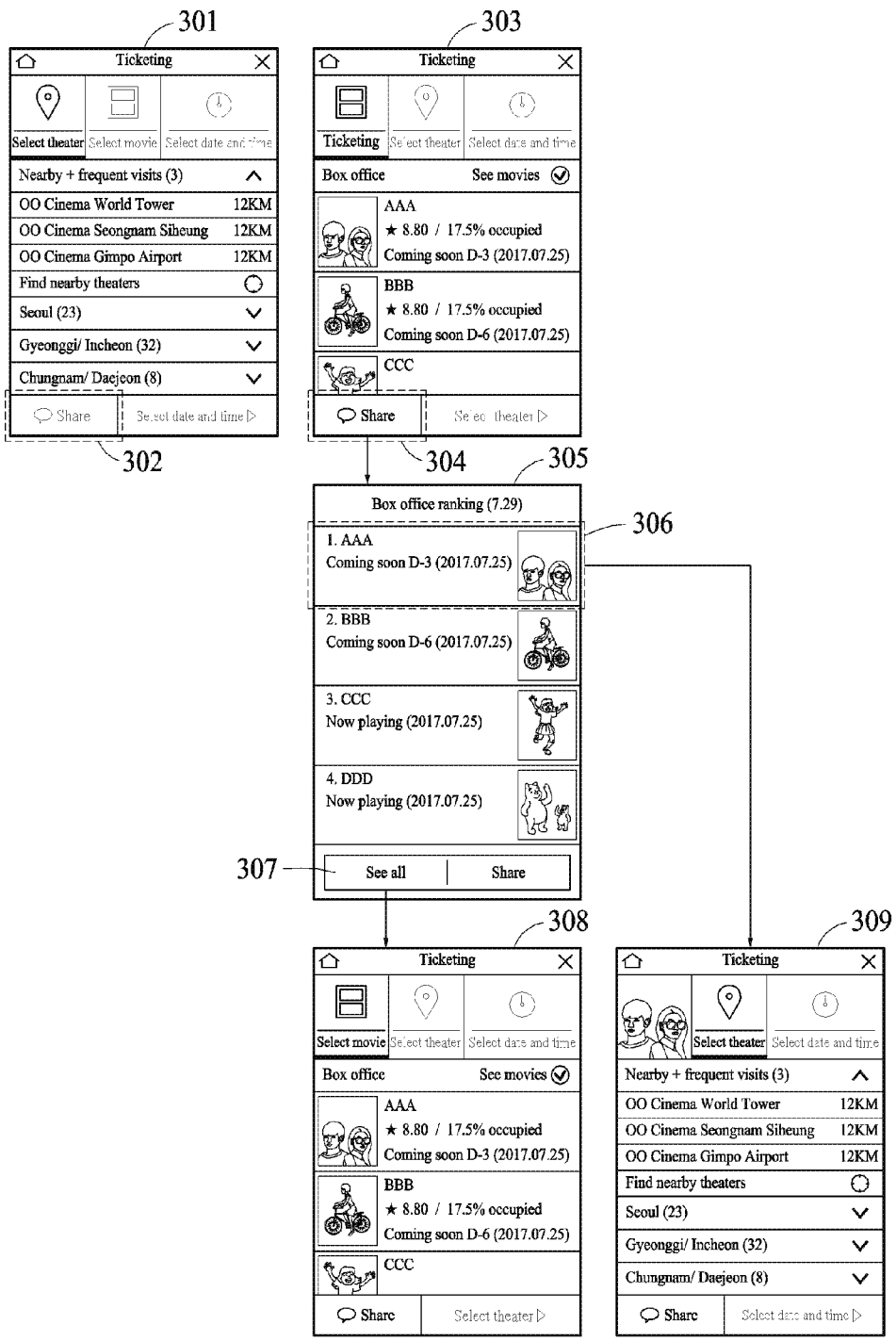
FIGS. 3A through 3D illustrate examples of a UI used for sharing booking information according to an example embodiment.
Figure 3B:
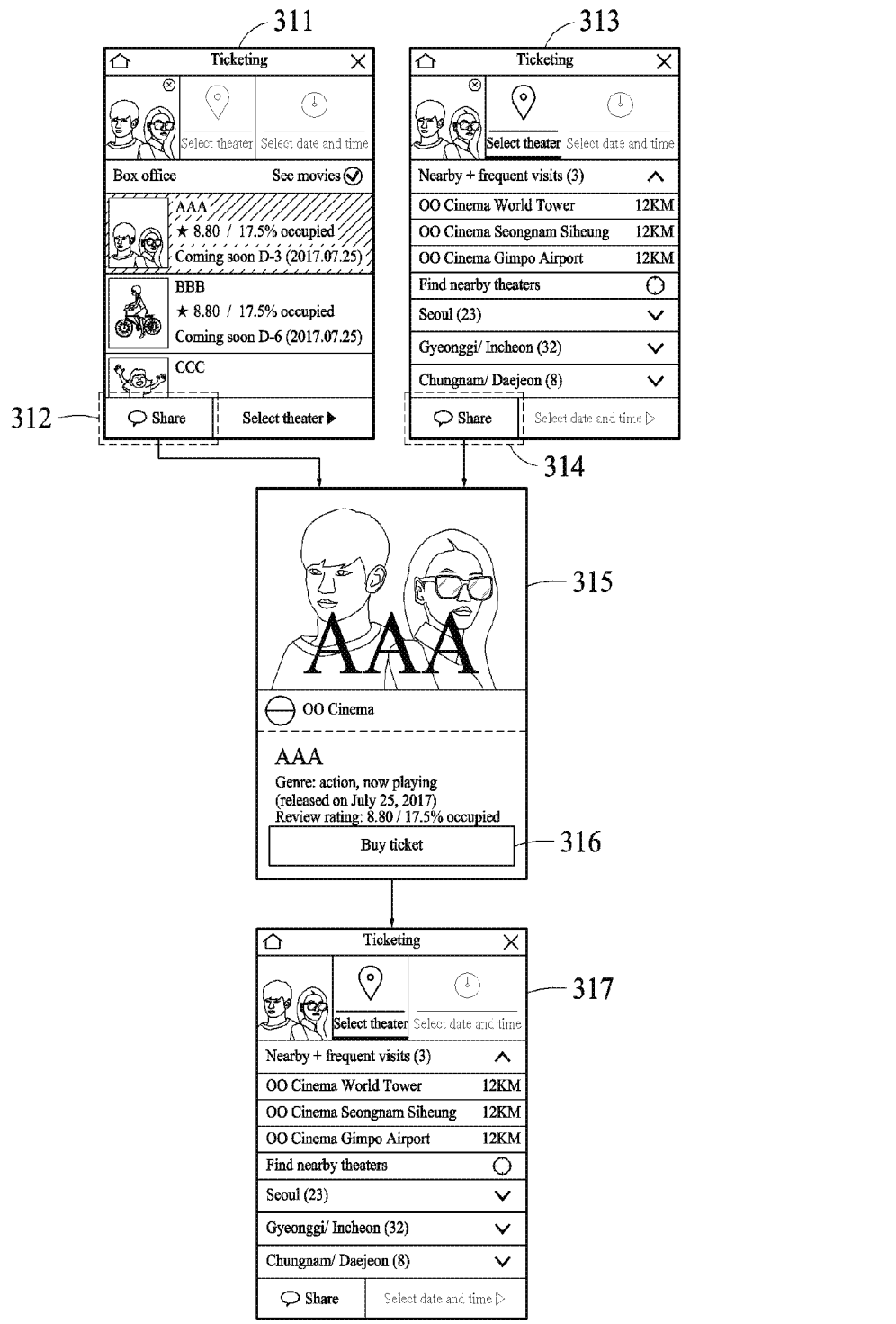
Figure 3C:
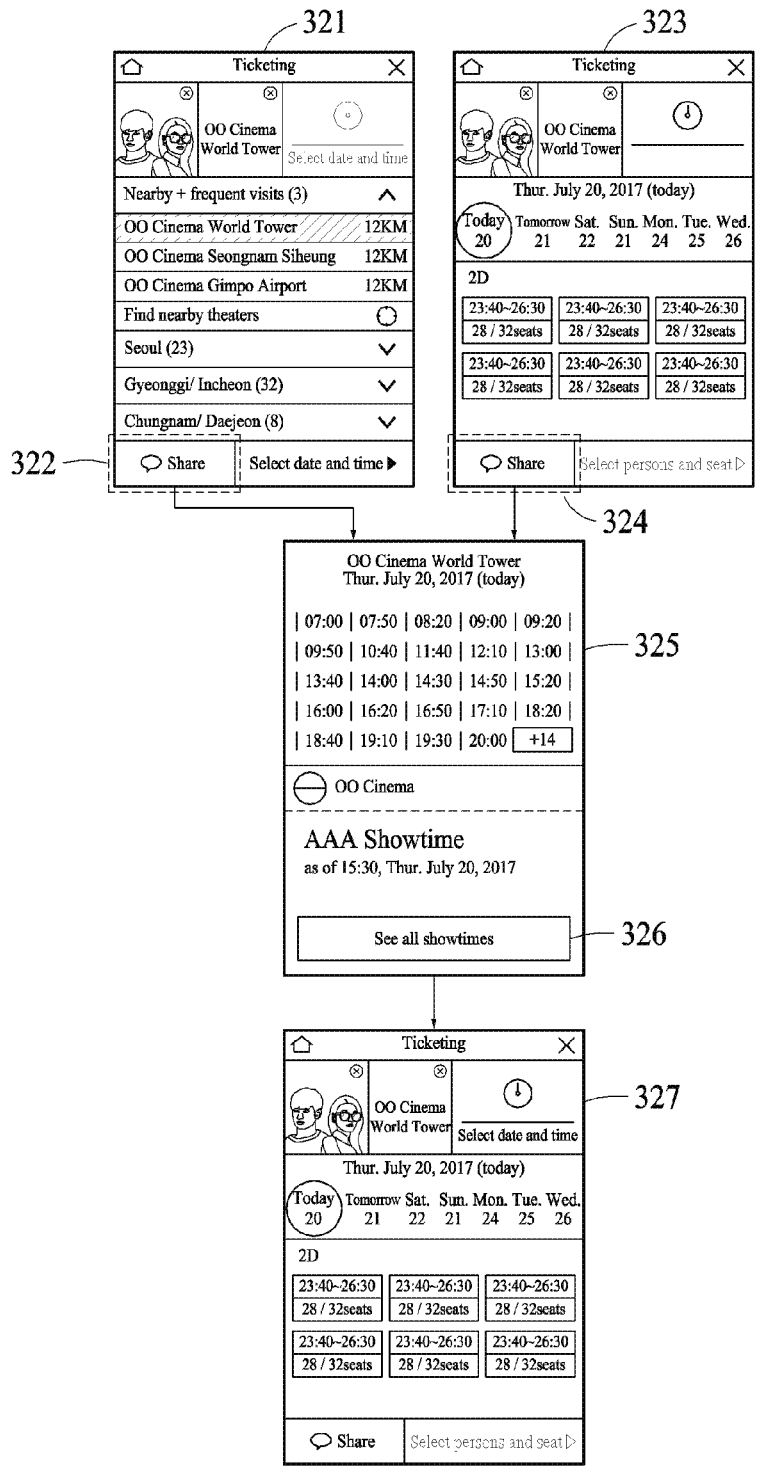
Figure 3D:
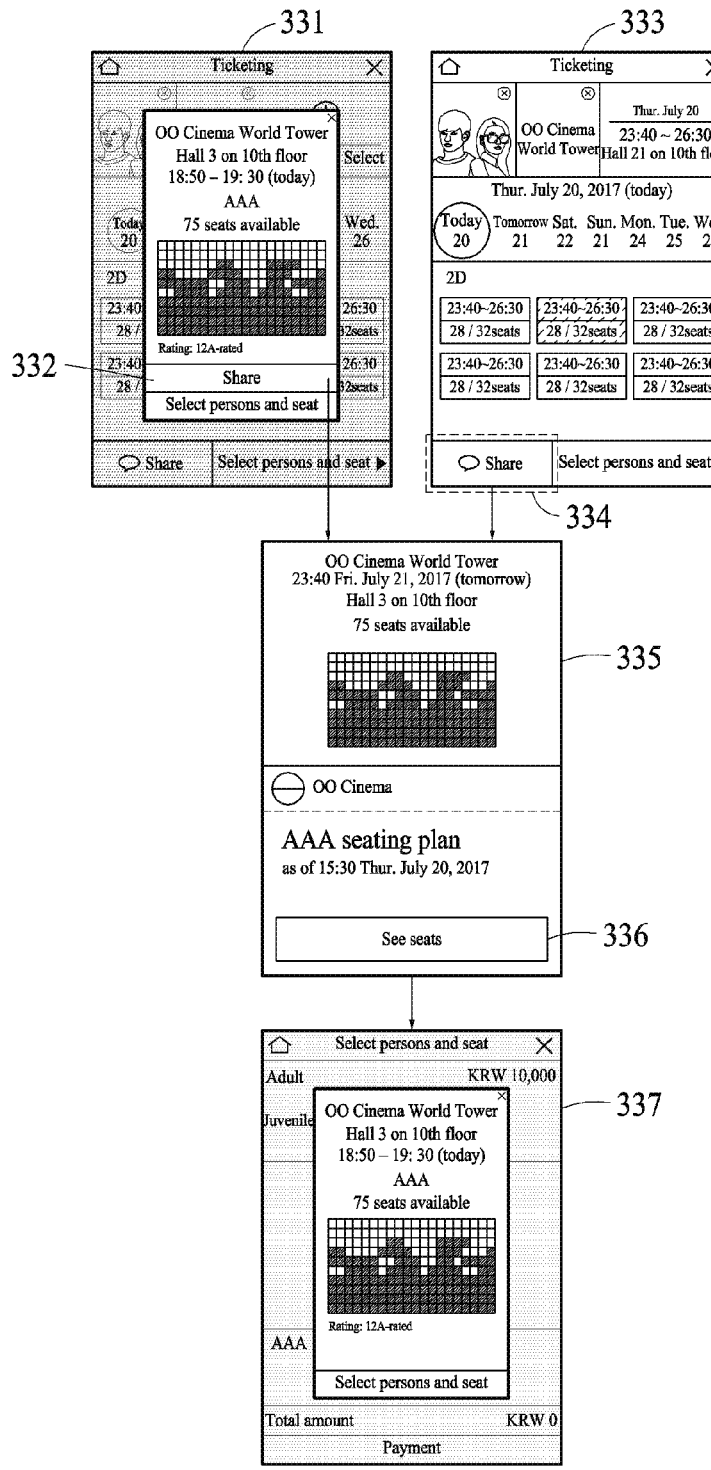

FIG. 1A illustrates an example of a system for sharing booking information or a ticket according to an example embodiment. FIGS. 1B and 1C illustrate examples of a user interface (UI) used for a method of sharing booking information according to an example embodiment. Hereinafter, the method of sharing booking information will be simply referred to as a booking information sharing method.

Referring to FIG. 1A, a system 100 includes a reservation/booking server 101, a messenger server 105, a sharer terminal 102, and a receiver terminal 106. A network 104 is configured to enable wired or wireless communication among various entities in the system 104. The reservation/booking server 101, the messenger server 105, the sharer terminal 102, and the receiver terminal 106 may communicate with one another through the network 104, and the network 104 may use standard communication technology and/or protocols.

The term "reserve" and/or "reserving" or "reservation" used herein refers to promising, in advance, the provision of a goods, space, service, or the like, and reservation may be completed when predefined reservation information is specified. The term "book" and/or "booking" used herein refers to purchasing, in advance, a provided goods, space, service, or the like at a cost, and booking may be completed when a payment for completed reservation is made. In addition, the term "booking information" used herein refers to information specifying a target of booking, and may include reservation information and payment information. Thus, a portion of an entirety of booking information may be reservation information, and reservation may be completed by the reservation information which is a portion of the entirety of booking information.

A target of reservation or booking may be the provision of various goods, spaces, services, or the like including, for example, movies, restaurants, amusement parks, exhibitions, stage performances and concerts, hospitals, events, accommodations, lessons or lectures, flights, trains, buses, hair shops, nail shops, snapshooting, and the like. For example, booking information used to book a restaurant, a medical checkup, and a vehicle maintenance may include information about a date, a time, and a location. For another example, booking information used to book an accommodation may include information about a date, a location, and a room. For another example, booking information used to book a movie, a concert, a flight, a train, and a bus may include information about a date, a time, a location, and a seat. For another example, booking information used to book a hospital, a hair shop, a nail shop, a spa, and snapshooting may include information about a date, a time, a location, a service provider, and a type of service to be provided. However, reservation information or booking information for reservation or booking may not be limited to the examples described in the foregoing, but may vary according to examples.

The reservation/booking server 101 may be configured to process, manage, transmit and/or receive, or store information associated with reservation or booking. The messenger server 105 may be configured to process an operation associated with the transmission of a message. The sharer terminal 102 of a sharer 103 refers to a terminal of an entity that shares reservation and/or booking information or a ticket. The receiver terminal 106 of a receiver 107 refers to a terminal of an entity that receives or accepts the sharing of the reservation and/or booking information or the ticket. However, such a sharing entity and receiving entity may not be a set concept, but the sharer terminal 102 and the receiver terminal 106 may be one of a terminal of a sharer and a terminal of a receiver based on a required operation.

The sharer terminal 102 and the receiver terminal 106 may include digital devices each including a memory means and a microprocessor and having a computing or operation ability, such as, for example, a personal computer (PC), a laptop computer, a mobile communication terminal such as a smartphone, a tablet, a wearable computer, a workstation, a palmtop computer, a personal digital assistant (PDA), and a webpad, and indicate all terminal devices that may be connected to web or mobile sites associated with the system 100 or install and execute service-dedicated applications.

An entity that performs each operation to provide a booking information sharing service or a ticket sharing service may correspond to at least one of servers and terminals described above based on a design intent or a system efficiency. The at least one of the servers and the terminals may be operated by a single operating entity, for example, a manager, or by an additional operating entity, or be embodied in an integrated form. In addition, the reservation/booking server 101 and the messenger server 105 may be embodied as a single server. In such a case, the single server may include a module configured to process information associated with reservation and/or booking, and a message transmitting module.

When the sharer 103 inputs a portion of the entirety of booking information through the sharer terminal 102 for booking, the system 100 may allow the receiver 107 to input a remaining portion of the entirety of booking information through the receiver terminal 106. Thus, the system 100 may allow both the sharer 103 and the receiver 107 to participate in an input of booking information for booking, allow the sharer 103 to more easily share the booking information input for the booking, allow the receiver 107 to more easily access the booking information shared with the receiver 107, and thereby provide convenience in an entire process related to the booking. The system 100 may allow a plurality of users to participate in inputting of information for a single set of booking to activate an electronic commerce for a booking service.

As illustrated in FIG. 1A, the sharer terminal 102 displays a UI 108 for inputting booking information. The sharer terminal 102 displays booking information 109, 110, or 111 of the entirety of booking information, which is input by the sharer 103, and activates a share button 112 on the UI 108. The sharer 103 enters an input to the activated share button 112, and transmits a sharing request for sharing the booking information to the reservation/booking server 101 through a messenger. In response to the sharing request, the reservation/booking server 101 then transmits a booking information sharing message 115 to the receiver terminal 106 through the messenger server 105. The sharer terminal 102 and the receiver terminal 106 may include the messenger installed therein, and thus the sharer 103 may transmit the booking information sharing message 115 through the messenger and the receiver 107 may receive the booking information sharing message 115 through the messenger. The receiver terminal 106 displays the booking information sharing message 115 in a chat room between the sharer 103 and the receiver 107. For example, a booking information sharing message 121 is displayed in a chat room of a messenger as illustrated in FIG. 1B.

Referring back to FIG. 1A, the booking information sharing message 115 provides an access 116 to an UI for displaying at least one portion of the entirety of booking information input by the sharer 103, or enabling an input of a remaining portion of the entirety of booking information. The term "access" and/or "accessing" used herein may include all operations involved with inputting booking information in a messenger in addition to accessing a page that enables an input of booking information through a link. The receiver 107 may perform the access 116 to the UI by clicking or touching a portion of the booking information sharing message 115 displayed in the chat room between the sharer 103 and the receiver 107. For example, the booking information sharing message 121 displayed in the chat room of the messenger provides an access 122 to a UI as illustrated in FIG. 1B.

A booking platform in the messenger may enable the execution of all operations or processes involved with inputting information associated with booking, or sharing or booking, and a user may perform functions related to the booking through the booking platform running in the messenger. In addition, a UI for sharing booking information may be provided through the booking platform in the messenger, and an access to the booking platform may be provided to the user through various paths in the messenger. For example, as illustrated in FIG. 1C, a path of an access to a booking platform includes a chat room 131 in a messenger, a life portal 133 in the messenger, a profile 136 of an official account in the messenger. The life portal 133 refers to a platform that provides life-related functions, for example, ordering, purchasing, shopping, reservation, booking, and the like, in the messenger. For example, a sharer may access the booking platform through a movie ticket button 132 displayed in the chat room 131 in the messenger. For another example, the sharer may access the booking platform through a movie ticket button 134 provided for booking a movie ticket among various buttons used to provide the life-related functions of the life portal 133 in the messenger. The life portal 133 displays information 135 associated with booking a movie. For another example, the sharer may access the booking platform through the profile 136 of the official account in the messenger. Herein, the term "official account" refers to an account that is distinguished from a personal account in the messenger, and may be used to provide various sets of information associated with an enterprise, a company or corporation, a group, an organization, a brand, an artist, an entertainer, media, and the like. An official account may be issued at the request of a group or an organization, and a user of the messenger may subscribe to the official account or register the group or the organization as a friend through the official account. Also, an official account may also be published or recommended to users of the messenger, and embodied as a bot-type account. As illustrated in FIG. 1C, the profile 136 of the official account may display the information associated with booking a movie.

Referring back to FIG. 1A, the receiver 107 may input booking information through an UI displayed by the receiver terminal 106. Hereinafter, how booking information is shared will be described in detail with reference to FIGS. 2 through 4.

When the sharer 103 receives, through the sharer terminal 102, a reserved ticket for which reservation is completed, the system 100 may transmit the ticket to the receiver terminal 106 based on a reserved number of persons for the ticket to share the ticket with the receiver 107. Herein, the term "ticket" may indicate virtual information that virtualizes a physical ticket, and be embodied as a link-type message that provides information associated with the ticket. The receiver terminal 106 receives the ticket through the messenger and displays the ticket in the chat room between the sharer 103 and the receiver 107. The ticket displayed in the chat room of the messenger may provide a UI providing information associated with the ticket, an access to a link providing the information associated with the ticket, or an access to the booking platform providing the information associated with the ticket. The receiver 107 verifies the received ticket through the booking platform in the messenger.

The system 100 provides a UI for sharing the ticket and a UI for displaying information associated with the shared ticket to intuitively provide information associated with the ticket and such ticket sharing. As described above, the system 100 may provide a UI that enables an input of information associated with ticket sharing and displays information associated with the ticket sharing, thereby providing a user with convenience in sharing a ticket and preventing an abuse of the ticket sharing. Hereinafter, ticket sharing will be described in detail with reference to FIGS. 5 through 7.

FIG. 2 is a flowchart illustrating an example of a booking information sharing method according to an example embodiment. FIGS. 3a through 3d illustrate examples of a UI for sharing booking information according to an example embodiment.

Referring to FIG. 2, in operation 201, an apparatus for sharing booking information, hereinafter simply referred to as a booking information sharing apparatus, provides a UI for sharing booking information. The booking information sharing apparatus refers to an apparatus configured to perform operations involved with sharing booking information and may be embodied by, for example, a software module, a hardware module, or a combination thereof. An entity that performs each of the operations may correspond to at least one of servers and terminals described above. For example, an operation of providing the UI for sharing booking information may be performed by a sharer terminal, a reservation/booking server, or a combination of the sharer terminal and the reservation/booking server Hereinafter, the operations of the booking information sharing apparatus may be performed by one of the servers and the terminals, or by a plurality of such entities in conjunction with each other.

For example, as illustrated in FIGS. 3A through 3D, a UI 301, 303, 311, 313, 321, 323, 331, or 333 is displayed by a sharer terminal to enable inputting of movie booking information and sharing of the booking information.

Herein, an entirety of booking information for booking a movie may include booking information corresponding to each of a movie, a theater which plays the movie, a playing date and time of the movie, a number of persons, a seat, and the like. For example, the UI 301 may enable a selection of booking information corresponding to a theater which plays a movie. The UI 303 may enable a selection of booking information corresponding to a movie. The UI 311 may display selected portion of booking information corresponding to a movie, and enable a transition to a step of selecting booking information corresponding to a theater which plays the movie. The UI 313 may display the selected booking information of the booking information corresponding to a movie, and enable a selection of the booking information corresponding to a theater which plays the movie. The UI 321 may display the selected booking information of the booking information corresponding to a movie, display the selected booking information of the booking information corresponding to a theater which plays the movie, and enable a transition to a step of selecting booking information corresponding to a playing date and time of the movie. The UI 323 may display the selected booking information of the booking information corresponding to a movie, display the selected booking information of the booking information corresponding to a theater which plays the movie, and enable a selection of the booking information corresponding to a playing date and time of the movie. The UI 331 or 333 may display the selected booking information of the booking information corresponding to a movie, the selected booking information of the booking information corresponding to a theater which plays the movie, and the selected booking information of the booking information corresponding to a playing date and time of the movie, and enable a transition to a step of selecting booking information corresponding to a number of persons and a seat. A hatched portion in the UI 311, 321, or 333 may be a visual effect indicating that corresponding booking information is selected. The sharer terminal may receive, from a sharer, an input to share buttons 304, 312, 314, 322, 324, 332, or 334 on the US 303, 311, 313, 321, 323, 331, or 333. In response to the input being received, the sharer terminal may transmit a booking information sharing message 305, 315, 325, or 335 to a receiver terminal.

Referring back to FIG. 2, in operation 202, the booking information sharing apparatus receives an input of booking information corresponding to at least one of items specifying an entirety of booking information through the UI for sharing booking information. The entirety of booking information refers to information needed to specify booking, and may be specified by a plurality of sets of booking information corresponding to a plurality of items. Herein, booking information may be a portion of the entirety of booking information.

In addition, a UI may enable a stepwise selection of booking information by each of the items corresponding to the entirety of booking information. For example, booking information for each item for booking a movie may include booking information corresponding to at least one of a movie, a theater which plays the movie, a playing date and time of the movie, a number of persons, and a seat. For example, the booking information sharing apparatus may receive a selection of booking information corresponding to a theater which plays a movie through the UI for booking a movie, update the UI to enable a selection of a movie, and receive the selection of booking information corresponding to the movie through the updated UI. The booking information sharing apparatus may update a UI to enable a selection of booking information for each item. Referring to FIGS. 3A through 3D, the booking information sharing apparatus may receive, through a UI, selected booking information of the entirety of booking information for booking a movie.

Referring back to FIG. 2, in operation 203, the booking information sharing apparatus receives a sharing request for sharing booking information corresponding to at least one portion of the entirety of booking information through the UI. The booking information sharing apparatus may determine whether to activate a share button on the UI based on the booking information input through the UI and at least one of the items of booking information to be displayed on the UI.

The booking information sharing apparatus may determine whether a condition for activating the share button on the UI is satisfied based on the input booking information. The booking information sharing apparatus may then activate the share button on the UI based on a result of the determining. The booking information sharing apparatus may receive a sharing request for sharing booking information through the activated share button. The sharer may enter an input to the activated share button on the UI, and the sharer terminal may transmit the sharing request to the reservation/booking server. Herein, the condition for activating the share button based on the input booking information may be modified or changed in various ways based on a design intent or a system efficiency. For example, when the input booking information includes information corresponding to at least two of a movie, a theater which plays the movie, a playing date and time of the movie, a number of persons, and a seat, or includes booking information corresponding to a movie, the booking information sharing apparatus may activate the share button on the UI.

In an example, the booking information sharing apparatus may identify an item corresponding to booking information to be displayed on the UI, and activate the share button on the UI based on the identified item. In this example, a condition for activating the share button based on the item corresponding to the booking information to be displayed on the UI may be modified or changed in various ways based on a design intent or a system efficiency.

As illustrated in FIGS. 3A through 3D, when an item corresponding to booking information to be displayed on the UI 301 is a theater which plays a movie and there is no selected booking information in the entirety of booking information, the booking information sharing apparatus may inactivate the share button 302 on the UI 301. However, when an item corresponding to booking information to be displayed on the UI 303 is a movie, the booking information sharing apparatus may activate the share button 304 on the UI 303. When booking information selected from the entirety of booking information through the UI 311, 313, 321, 323, 331, or 333 includes the booking information corresponding to a movie, the booking information sharing apparatus may activate the share button 312, 314, 322, 324, 332, or 334 on the UI 311, 313, 321, 323, 331, or 333.

The booking information sharing apparatus may activate a share button on a UI under a certain condition. Herein, the condition may indicate a condition for activating a share button, and be defined in various ways based on a design intent or a system efficiency. The condition may be defined based on whether booking information is input to encourage a receiver of shared booking information to participate in inputting booking information. For example, when the entirety of booking information for booking a movie includes booking information for each of the items, and the items include a movie, a theater which plays the movie, a playing date and time of the movie, a number of persons, and a seat, the condition may be defined based on an item corresponding to input booking information. The booking information sharing apparatus may streamline or simplify a process of inputting booking information by a receiver through sharing of booking information through an activated share button.

Referring back to FIG. 2, in operation 204, in response to the sharing request for sharing booking information, the booking information sharing apparatus identifies at least one of the items corresponding to booking information input until a current point in time. For example, when the input booking information is a portion of the entirety of booking information and the items of the entirety of booking information include a movie, a theater which plays the movie, a playing date and time of the movie, a number of persons, and a seat, the booking information sharing apparatus may identify a combination of at least one of the movie, the theater which plays the movie, the playing date and time of the movie, the number of persons, and the seat to be the at least one item corresponding to the booking information input until the current point in time.

In operation 205, the booking information sharing apparatus generates a booking information sharing message that includes first booking information corresponding to the identified at least one item and enables an input of second booking information corresponding to at least one other item among the items which is distinguishable from the identified at least one item. Herein, the first booking information may be booking information corresponding to the at least one item identified to generate the booking information sharing message. The second booking information which is distinguishable from the first booking information may be, for example, remaining booking information of the entirety of booking information from which the first booking information is excluded. For example, when the items of the entirety of booking information include a movie, a theater which plays the movie, a playing date and time of the movie, a number of persons, and a seat, and the identified at least one item includes a movie and a theater which plays the movie, the booking information sharing message may include first booking information corresponding to a movie and a theater which plays the movie and may enable an input of second booking information corresponding to a playing date and time of the movie, the number of persons, and a seat.

In response to the sharing request received through the UI, the booking information sharing apparatus may determine a sharing target candidate to be displayed on the UI. The sharing target candidate refers to a candidate for a sharing target with which booking information is to be shared and to which the booking information sharing message is to be transmitted, and may be displayed on a UI of the sharer terminal.

The booking information sharing apparatus may receive an input of a selection of at least one sharing target from among sharing target candidates through a UI. The UI may be displayed by the sharer terminal, and the sharer may select the at least one from among the sharing target candidates displayed on the UI. Hereinafter, a sharing target candidate and a sharing target will be described in detail with reference to FIG. 4.

Figure 4:
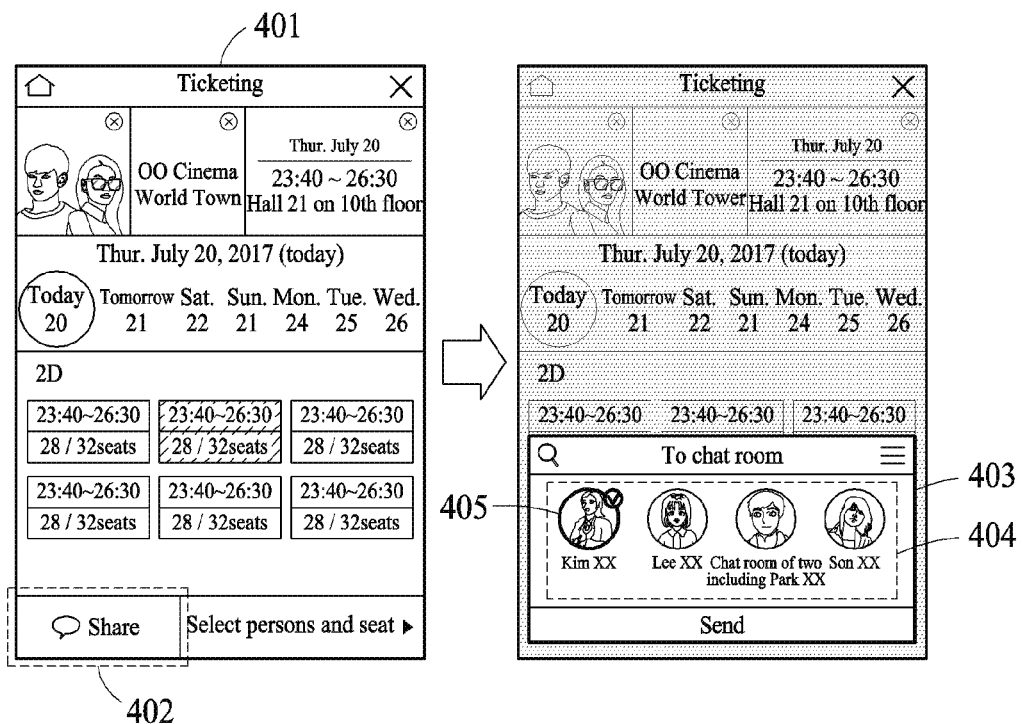
FIG. 4 illustrates an example of a sharing target with whom information is to be shared and an example of a candidate for the sharing target according to an example embodiment.

FIG. 4 illustrates an example of a sharing target candidate and an example of a sharing target according to an example embodiment.

Referring to FIG. 4, a booking information sharing apparatus provides a UI 401 for sharing booking information, and activates a share button 402 on the UI 401. A hatched portion of the UI 401 may be a visual effect indicating that corresponding booking information is selected.

In response to a sharing request made through the share button 402, the booking information sharing apparatus determines sharing target candidates 404 to be displayed on a UI 403. As described above, an entity that determines the sharing target candidates 404 may be a reservation/booking server, a sharer terminal, or a combination thereof. The sharing target candidates 404 may include at least one of a friend of the sharer or a chat room. As described above, the UI 401 may be provided in a messenger, and a friend of the sharer and a chat room may indicate a friend registered in the messenger and a chat room of the messenger, respectively.

In an example, the booking information sharing apparatus may identify a chat room providing an access to the UI 401. As described above, the access to the UI 401 may be provided through the chat room of the messenger. A receiver may perform the access to the UI 401 through the chat room of the messenger, and the booking information sharing apparatus may identify the chat room while providing the UI 401. The booking information sharing apparatus may identify at least one friend participating in the identified chat room. The booking information sharing apparatus may determine a sharing target candidate to be preferentially displayed on the UI 403 based on the identified at least one friend. The booking information sharing apparatus may determine a sharing target candidate ranking to be displayed on the UI 403 by arranging the sharing target candidates 404. The booking information sharing apparatus may arrange the sharing target candidates 404 in sequential order based on the sharing target candidate ranking. The booking information sharing apparatus may increase a rank of the identified friend. For example, a rank of a friend participating in the identified chat room may be higher than a rank of a friend who does not participate in the chat room. The sharer terminal may display the sharing target candidates 404 on the UI 403 in sequential order arranged based on the sharing target candidate ranking.

As illustrated in FIG. 4, the booking information sharing apparatus determines a second sharing target candidate 405 to be selected as a default from among the sharing target candidates 404 based on the identified friend. A UI may display a visual effect indicating that the second sharing target candidate 405 is selected as the default. The booking information sharing apparatus determines the identified friend to be the second sharing target candidate 405 and the UI 403 displays the second sharing target candidate 405.

For example, when received first booking information includes booking information corresponding to a number of persons, the booking information sharing apparatus may determine the sharing target candidates 404 or the second sharing target candidate 405 based on the number of persons and a number of participants in a chat room. In this example, the booking information sharing apparatus may determine the sharing target candidates 404 or the second sharing target candidate 405 based on a chat room having a number of participants less than or equal to the number of persons corresponding to the first booking information.

For another example, the booking information sharing apparatus may determine the sharing target candidates 404 or the second sharing target candidate 405 based on a history of transmitting the booking information sharing message transmitted from the sharer. Based on the history of transmitting the booking information sharing message from the sharer, the booking information sharing apparatus may identify a friend or a chat room transmitting the booking information sharing message the most, and determine the identified friend or chat room to be the sharing target candidates 404 or the second sharing target candidate 405.

For example, when received first booking information includes booking information corresponding to a number of persons, the booking information sharing apparatus may generate an allowable sharing number of the first booking information by subtracting a sharing number of the first booking information from the number of persons corresponding to the first booking information. The sharing number of the first booking information may indicate how many times the first booking information has been shared until a current point in time. The booking information sharing apparatus may restrict a number of sharing targets of the first booking information to be less than or equal to the allowable sharing number, and receive the input of the selection of the at least one sharing target from among the sharing target candidates 404.

Referring back to FIG. 2, in operation 206, the booking information sharing apparatus transmits the booking information sharing message to at least one receiver terminal through the messenger. The booking information sharing apparatus may transmit the booking information sharing message using a chat room in which the sharer and the selected at least one sharing target participate. The booking information sharing apparatus may use a messenger server to transmit the booking information sharing message.

Referring back to FIGS. 3A through 3D, the receiver terminal may display the booking information sharing message 305, 315, 325, or 335. The booking information sharing message 305, 315, 325, or 335 may display at least one portion of the first booking information, or provide an access 306, 307, 316, 326, or 336 to a second UI 308, 309, 317, 327, or 337 enabling an input of second booking information. The receiver terminal may receive an input for the access 306 from the receiver, and display the second UI 309 in response to the input being received. In response to the input for the access 307, 316, 326, or 336, the second UI 308, 317, 327, or 337 may be displayed by the receiver terminal. The booking information sharing message 305, 315, 325, or 335, and the second UI 308, 309, 317, 327, or 337 may be displayed by the receiver terminal. The receiver may input the second booking information through the second UI 308, 309, 317, 327, or 337, and complete booking.

In an example, the receiver may input the second booking information that is distinguishable from the first booking information previously input from the sharer, or input changed first booking information by changing the previously input first booking information, through the second UI 308, 309, 317, 327, or 337.

In another example, the second UI 308, 309, 317, 327, or 337 may restrict a change of the previously input first booking information. When the restriction of the change of the first booking information is set as a default, the change of the first booking information may be basically restricted, and an additional or separate setting may be needed to allow the change of the first booking information. The booking information sharing apparatus may not allow the sharer and the receiver to change or modify the first booking information, or assign a right to change or modify the first booking information only to the sharer between the sharer and the receiver. For example, when the right to change or modify the first booking information is assigned only to the sharer, the booking information sharing apparatus may receive information input from the sharer and change or modify the first booking information based on the received information. For example, as illustrated, the booking information sharing apparatus may not allow the sharer and the receiver to change or modify the second booking information input through the second UI 308, 309, 317, 327, or 337, or may assign a right for the second booking information only to the receiver between the sharer and the receiver.

In an example, as illustrated, the booking information sharing apparatus may receive an input of the second booking information through the second UI 308, 309, 317, 327, or 337, complete booking based on the second booking information, and generate a booked ticket for which the booking is completed. In this example, when the input of the second booking information is performed by the receiver terminal of the receiver, the booking information sharing apparatus may transmit the ticket to the receiver terminal.

A right for a payment to be made to complete the booking may be set by the sharer or set as a default. The right for the payment set as a default may indicate that the right for the payment is set to be basically assigned to one and an additional setting may be needed to change the one to whom the right for the payment is assigned. The booking information sharing apparatus may assign the right for the payment only to the sharer between the sharer and the receiver, or to both the sharer and the receiver. For example, as illustrated, when the right for the payment is assigned only to the sharer, the second UI 308, 309, 317, 327, or 337 may enable an input of the second booking information by excluding a payment function, and the booking information sharing apparatus may transmit the booked ticket to the sharer terminal in response to the payment being made by the sharer. In an example, the booking information sharing apparatus may identify a payer for the payment from between the sharer and the receiver to complete the booking, and transmit the ticket to the sharer terminal or the receiver terminal based on a result of the identifying.

The booking information sharing apparatus may provide an UI for sharing the booked ticket, and receive a ticket sharing request for sharing the ticket through the UI for sharing the ticket. In response to the ticket sharing request through the UI for sharing the ticket, the booking information sharing apparatus may determine the sharer of the first booking information to be a sharing target candidate or to be a second sharing target candidate to be selected as a default from among sharing target candidates. For example, the booking information sharing apparatus may update the UI to display a message querying the sharer of the first booking information, for example, "do you want to share the ticket with the sharer of the first booking information? yes or no," to determine the sharing target of the ticket. Since a portion of booking information of the booked ticket is input by the sharer of the first booking information, the sharer of the first booking information may be preferentially determined to be the sharing target of the ticket. The booking information sharing apparatus may transmit the ticket using a chat room in which the share and a second receiver participate. Hereinafter, an example of ticket sharing will be described in detail with reference to FIGS. 5 through 7.

Figure 5:
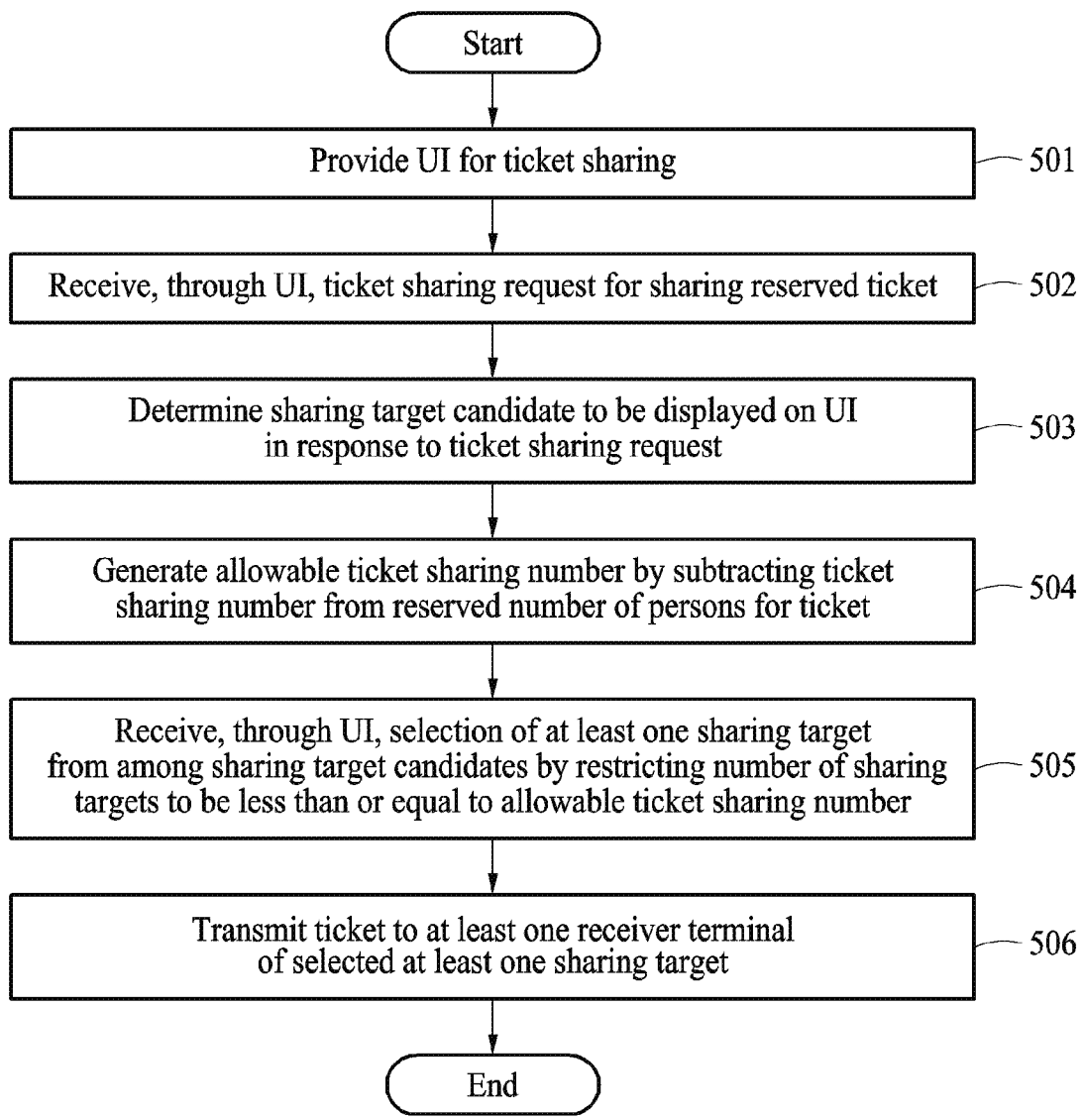
FIG. 5 is a flowchart illustrating an example of a method of sharing a ticket according to an example embodiment.
Figure 6:
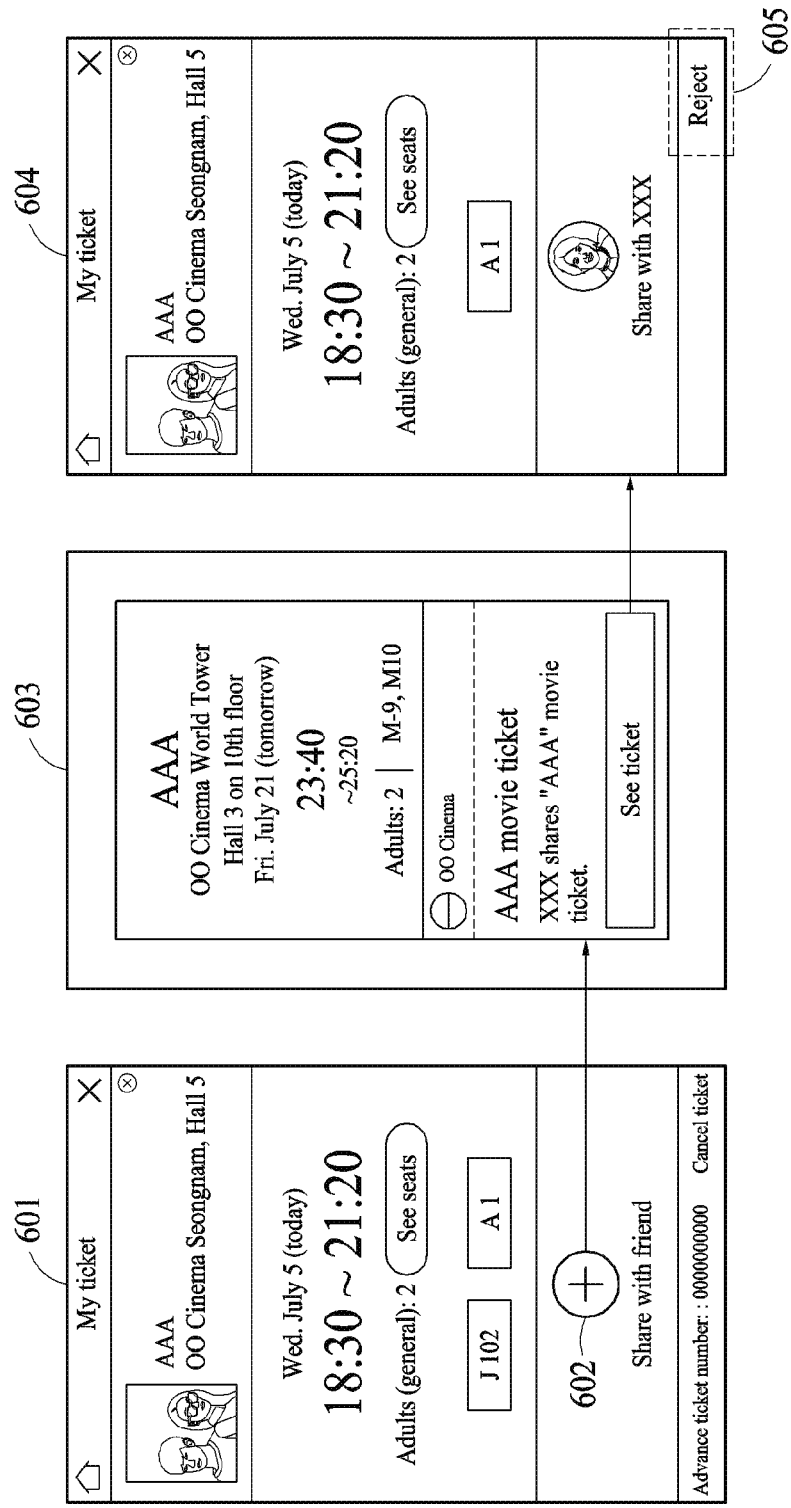
FIG. 6 illustrates an example of a UI used for sharing a ticket according to an example embodiment.

FIG. 5 is a flowchart illustrating an example of a method of sharing a ticket according to an example embodiment. FIG. 6 illustrates an example of a UI for ticket sharing according to an example embodiment. Hereinafter, the method of sharing a ticket will be simply referred to as a ticket sharing method.

Referring to FIG. 5, in operation 501, an apparatus for sharing a ticket, hereinafter simply referred to as a ticket sharing apparatus, provides a UI for ticket sharing. The ticket sharing apparatus refers to an apparatus configured to perform operations involved with ticket sharing and may be embodied by, for example, a software module, a hardware module, or a combination thereof. An entity that performs each of operations for ticket sharing may correspond to at least one of servers and terminals described above. For example, an operation of providing the UI for ticket sharing may be performed by a sharer terminal or a reservation/booking server, or performed in conjunction with the sharer terminal and the reservation/booking server. Operations of the ticket sharing apparatus to be described hereinafter may be performed by one of the servers and terminals described above, or performed by a plurality of entities in conjunction with each other. For example, as illustrated in FIG. 6, the sharer terminal displays a UI 601 for ticket sharing, and the UI 601 includes information associated with a ticket, a share button 602, and a cancel button.

Figure 7:
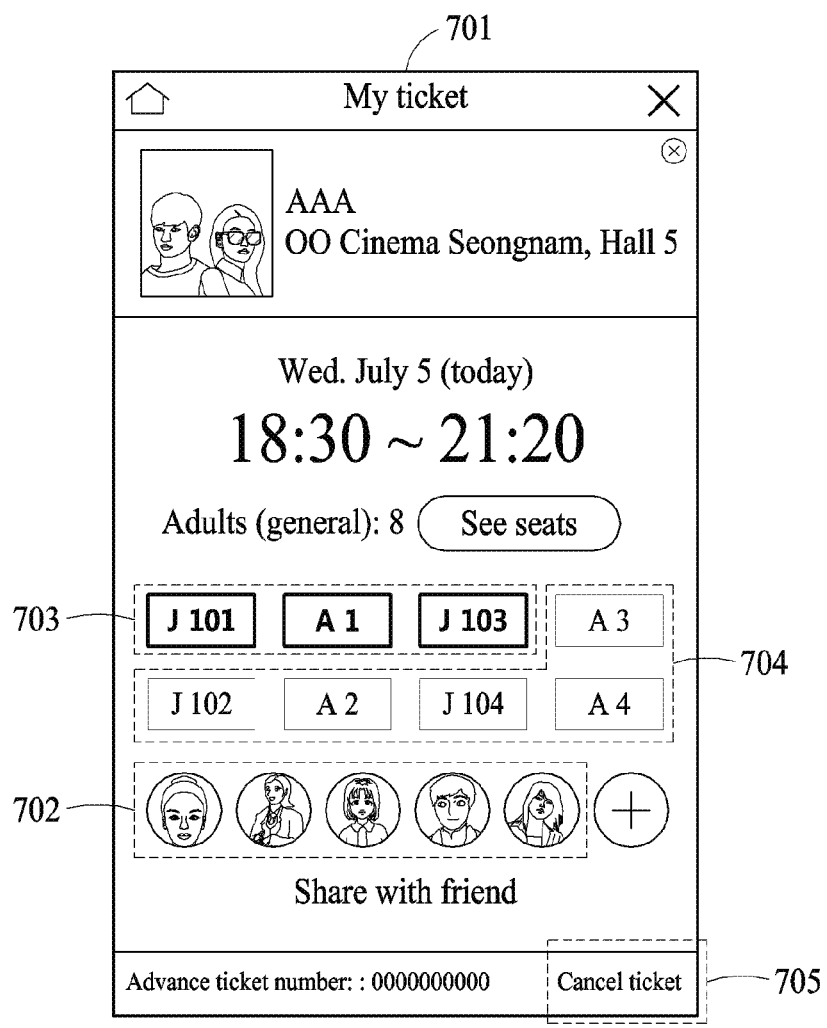
FIG. 7 illustrates another example of a UI used for sharing a ticket according to an example embodiment.

Referring back to FIG. 5, in operation 502, the ticket sharing apparatus receives a ticket sharing request for sharing a reserved ticket for which reservation is completed through the UI. The reserved ticket refers to a ticket for which all processes, excluding a process for a payment, for booking the ticket are completed, and thus sharing of the reserved ticket may be applied to sharing of a booked ticket for which the payment is completed and booking is thereby completed. An example of sharing of a reserved ticket and an example of sharing of a booked ticket may be implemented in substantially the same manner, except for whether a payment is completed. Although ticket-related UIs illustrated in FIGS. 6 and 7 are provided to describe an example of sharing of a booked ticket, the sharing of the booked ticket may be implemented simply by adding a process for a payment to sharing of a reserved ticket. Thus, the following examples will be described based on the sharing of the reserved ticket.

In operation 503, in response to the ticket sharing request, the ticket sharing apparatus determines a sharing target candidate to be displayed on the UI. The examples described above may be applied to the determining of a sharing target candidate. For example, as illustrated in FIG. 6, the ticket sharing apparatus receives a ticket sharing request through the share button 602 on the UI 601, and updates the UI 601 such that a sharing target candidate is displayed thereon.

In operation 504, the ticket sharing apparatus generates an allowable ticket sharing number by subtracting a ticket sharing number from a reserved number of persons for the ticket. Herein, the allowable ticket sharing number indicates a number of times that the ticket is available to be shared, and the ticket sharing number indicates a number of times the ticket has already been shared. When the ticket is shared, the allowable ticket sharing number may be reduced accordingly and the ticket sharing apparatus may share the ticket by the remaining allowable ticket sharing number.

In operation 505, the ticket sharing apparatus restricts a number of sharing targets of the ticket to be less than or equal to the allowable ticket sharing number, and receives a selection of at least one sharing target from among sharing target candidates. The ticket sharing apparatus may prevent malicious ticket sharing by restricting the number of sharing targets who share the ticket. In an example, the ticket sharing apparatus may identify a chat room selected through a UI from among the sharing target candidates. In this example, when a number of participants in the identified chat room is greater than the allowable ticket sharing number, the ticket sharing apparatus may update the UI such that a portion of the participants in the chat room is selected. The ticket sharing apparatus may restrict a selection of a sharing target to allow only a portion of the participants in the chat room to share the ticket. In response to the selection of a sharing target, the target sharing apparatus may update the allowable ticket sharing number and update the UI to display the updated allowable ticket sharing number. For example, in response to the selection of a sharing target, the ticket sharing apparatus may update the UI to display at least one selected sharing target on a sharing target list.

In operation 506, the ticket sharing apparatus transmits the ticket to at least one receiver terminal of the selected at least one sharing target. Herein, the receiver terminal described above with reference to FIGS. 2 through 4 may be a terminal configured to receive a booking information sharing message, and the receiver terminal described with reference to FIGS. 5 through 7 may be a terminal configured to receive a ticket.

As illustrated in FIG. 6, the ticket sharing apparatus provides a second UI 603 or 604 to display information of the ticket to the receiver terminal of the receiver receiving the ticket. The second UI 603 or 604 may display at least one of a sharer, a seating for the ticket, or a seat of the receiver in the seating for the ticket. In an example, as illustrated, the target sharing apparatus receives a ticket sharing rejection request for rejecting the sharing of the ticket through the second UI 604. The second UI 604 includes a sharing reject button 605, and the receiver may enter an input to the sharing reject button 605 displayed on the receiver terminal. In response to the sharing rejection request made through the sharing reject button 605, the ticket sharing apparatus may decrease the number of ticket sharing. In response to the sharing rejection request made through the sharing reject button 605, the ticket sharing apparatus may update the UI 601 such that the sharing target rejecting the sharing of the ticket is eliminated from the sharing target list.

FIG. 7 illustrates another example of a UI for ticket sharing according to an example embodiment.

Referring to FIG. 7, the ticket sharing apparatus transmits a ticket, and updates a UI 701 to display a sharing target 702 with whom the ticket is shared. The UI 701 may be displayed by a sharer terminal of a sharer of the ticket. The UI 701 may display seats 703 and seats 704 for the ticket. The ticket sharing apparatus updates the UI 701 such that the seats 704 for the ticket transmitted to the sharing target 702 and the seats 703 which are available to be shared are distinguishable from each other. The UI 701 includes a booking cancel button 705 to cancel booking of the ticket.

In an example, a receiver terminal of a receiver may receive the ticket, and provide the receiver with a second UI to display information of the ticket. The ticket sharing apparatus may receive a ticket sharing rejection request for rejecting sharing of the ticket through the second UI, and exclude the receiver from sharing targets in response to the received ticket sharing rejection request. For example, as illustrated, the ticket sharing apparatus updates the UI 701 to display the sharing targets from which the receiver is excluded. The updated UI 701 may display the sharing targets from which the receiver is excluded. The target sharing apparatus updates the UI 701 to display a seating plan for the ticket in which seats of the sharing targets from which the receiver is excluded are distinguishably indicated.

In an example, the ticket sharing apparatus may determine whether the sharer of the ticket is one who is reserving the ticket. In response to the sharer being the one who is reserving the ticket, the ticket sharing apparatus may receive a selection of at least one sharing cancellation target with whom the sharing of ticket is to be cancelled from among the sharing targets through the UI 701, and cancel the ticket transmitted to a receiver terminal of the selected at least one sharing cancellation target. The ticket sharing apparatus may transmit a ticket sharing cancellation notification, which is a notification of cancellation of sharing the ticket, to the receiver terminal. The ticket sharing apparatus may update the sharing targets by excluding the sharing cancellation target. The ticket sharing apparatus may update the UI 701 such that the updated sharing targets are displayed, and seats of the updated sharing targets are distinguishable from the seats for the ticket.

The ticket sharing apparatus may determine whether the sharing of the ticket is cancellable based on a time specified by the reservation of the ticket, and restrict the cancellation of the sharing of the ticket based on a result of the determining. For example, an allowable sharing cancellation condition may be set to disallow cancellation of sharing a ticket for a movie 20 minutes before a show time of the booked movie.

In response to the sharer being the one who is reserving the ticket, the ticket sharing apparatus may receive a ticket reservation cancellation request for cancelling the reservation of the ticket through the UI 701. In response to the reservation cancellation request, the ticket sharing apparatus may cancel the reservation of the ticket. For example, the ticket sharing apparatus may receive the reservation cancellation request through a reservation cancel button 705 on the UI 701. The ticket sharing apparatus may transmit a ticket reservation cancellation notification, which is a notification of cancellation of the reservation of the ticket, to the receiver terminal to which the ticket is transmitted. The ticket sharing apparatus may provide a UI for displaying the cancellation of the reservation.

Although not illustrated, a server and a terminal according to an example embodiment may include at least one processor, a memory, and a communication interface. The processor, the memory, and the communication interface may be connected to one another through a communication bus. The processor may perform at least one of methods described above with reference to FIGS. 1A through 7 using the memory and the communication interface, or perform an algorithm corresponding to the at least one method. The processor may execute a program, and control the server. A code of the program to be executed by the processor may be stored in the memory, and the memory may store a database. The memory may include, for example, a high-speed random-access memory (RAM) such as a dynamic RAM (DRAM), a static RAM (SRAM), a double data rate (DDR) synchronous DRAM (SDRAM), and other high-speed access solid-state storage devices. The memory may include a volatile memory and a nonvolatile memory. The memory may selectively include at least one storage device located remote from the processor.

The server may be a single server computer or a similar system, or one or more server banks or other servers arranged differently. The server may be disposed in a single facility, or a server cloud distributed to different geographical locations.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of sharing booking information, comprising:
   providing, by a sharer terminal, a user interface (UI) for sharing booking information;
   receiving, through the UI of the sharer terminal, an input of booking information corresponding to at least one of items specifying an entirety of booking information required to specify booking;
   receiving, through the UI of the sharer terminal, a sharing request for sharing at least one portion of the entirety of booking information;
   in response to the sharing request, identifying the at least one item corresponding to the booking information input;
   generating a booking information sharing message including first booking information corresponding to the identified at least one item and enabling an input of second booking information corresponding to at least one other item among the items distinguishable from the identified at least one item; and
   transmitting, the booking information sharing message to at least one receiver terminal through a messenger,
   wherein the receiving of the sharing request comprises:
   determining whether a condition for activating a share button on the UI is satisfied based on whether the at least one portion of the entirety of booking information is input,
   wherein before the condition is satisfied, the share button on the UI is displayed but is not activated such that the share button is not selectable.

2. The method of claim 1, wherein the receiving of the sharing request further comprises:
   activating the share button based on a result of the determining; and
   receiving the sharing request through a selection of the activated share button.

3. The method of claim 1, wherein the UI is configured to enable a stepwise selection of booking information by each of the items corresponding to the entirety of booking information, and
   wherein the receiving of the sharing request comprises:
   identifying an item corresponding to booking information to be displayed on the UI;
   activating a share button on the UI based on the identified item; and
   receiving the sharing request through the activated share button.

4. The method of claim 1, wherein the booking information sharing message is configured to provide an access to a second UI configured to enable the input of the second booking information, and
   wherein the second UI is configured to restrict a change of the first booking information.

5. The method of claim 4, further comprising:
   receiving, by the at least one receiver terminal, the input of the second booking information through the second UI;
   completing booking of a ticket based on the second booking information;
   generating a booked ticket for the completed booking;
   transmitting the booked ticket to a second receiver terminal;
   providing, by a booking information sharing apparatus, a third UI for sharing the booked ticket;
   receiving, through the third UI of the booking information sharing apparatus, a ticket sharing request for sharing the booked ticket;
   in response to the ticket sharing request, determining, by the booking information sharing apparatus, the sharer terminal of the first booking information to be a sharing target candidate or to be a second sharing target candidate selected as a default from among sharing target candidates, wherein the booking information sharing apparatus is different from the sharer terminal; and
   transmitting the ticket using a chat room in which the sharer terminal and the second receiver terminal participate.

6. The method of claim 1, further comprising:
   in response to the sharing request, determining a sharing target candidate to be displayed on the UI; and
   receiving, through the UI, a selection of at least one sharing target from among sharing target candidates, wherein the at least one receiver terminal corresponds to the selected at least one sharing target.

7. The method of claim 6, wherein the determining of the sharing target candidate comprises:
   identifying a chat room providing an access to the UI;
   identifying at least one friend participating in the identified chat room; and
   determining a sharing target candidate to be preferentially displayed on the UI or a second sharing target candidate to be selected as a default from among the sharing target candidates, based on the identified at least one friend.

8. The method of claim 6, wherein the determining of the sharing target candidate comprises:
   determining a sharing target candidate or a second sharing target candidate to be selected as a default from among the sharing target candidates, based on a history of transmitting the booking information sharing message from a sharer.

9. The method of claim 6, wherein the transmitting of the booking information sharing message comprises:

transmitting the booking information sharing message using a chat room in which a sharer and the at least one sharing target participate,
wherein the sharing target candidates include at least one of a friend of the sharer or the chat room.

10. A non-transitory computer-readable storage medium storing instructions that, when executed by a processor, cause the processor to perform the method of claim 1.

\* \* \* \* \*